(12) United States Patent
Mullis et al.

(10) Patent No.: US 10,891,533 B2
(45) Date of Patent: *Jan. 12, 2021

(54) NON-TRANSFERABLE RADIO FREQUENCY IDENTIFICATION LABEL OR TAG

(71) Applicant: Neology, Inc., San Diego, CA (US)

(72) Inventors: Joe Mullis, Oceanside, CA (US); Steve Gonzalez, San Diego, CA (US); Emily Olanoff, San Diego, CA (US)

(73) Assignee: NEOLOGY, INC., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/530,921

(22) Filed: Aug. 2, 2019

(65) Prior Publication Data
US 2020/0019834 A1    Jan. 16, 2020

Related U.S. Application Data

(63) Continuation of application No. 15/957,633, filed on Apr. 19, 2018, now Pat. No. 10,373,044, which is a continuation of application No. 15/413,147, filed on Jan. 23, 2017, now Pat. No. 9,978,012, which is a continuation of application No. 14/581,576, filed on Dec. 23, 2014, now Pat. No. 9,552,541, which is a continuation of application No. 13/736,806, filed on Jan. 8, 2013, now Pat. No. 8,915,449, which is a continuation of application No. 12/573,825, filed on Oct. 5, 2009, now Pat. No. 8,350,704.

(60) Provisional application No. 61/102,645, filed on Oct. 3, 2008.

(51) Int. Cl.
G06K 19/07    (2006.01)
G06K 19/077   (2006.01)
G08B 13/24    (2006.01)

(52) U.S. Cl.
CPC ... *G06K 19/07798* (2013.01); *G06K 19/0723* (2013.01); *G06K 19/0776* (2013.01); *G06K 19/07722* (2013.01); *G06K 19/07749* (2013.01); *G06K 19/07783* (2013.01); *G08B 13/2417* (2013.01); *G08B 13/2437* (2013.01)

(58) Field of Classification Search
CPC ......... G06K 19/07798; G06K 19/0723; G06K 19/07722; G06K 19/07749; G06K 19/0776; G06K 19/07783; G08B 13/2417; G08B 13/2437
USPC ....................................................... 235/488
See application file for complete search history.

(56) References Cited

U.S. PATENT DOCUMENTS

| | | |
|---|---|---|
| 7,102,520 B2 | 9/2006 | Liu et al. |
| 7,224,280 B2 | 5/2007 | Ferguson et al. |
| 7,728,734 B2 | 6/2010 | Arai et al. |
| 7,768,405 B2 | 8/2010 | Yamazaki et al. |

(Continued)

*Primary Examiner* — Daniel A Hess
(74) *Attorney, Agent, or Firm* — Procopio, Cory, Hargreaves & Savitch LLP

(57) ABSTRACT

A Non-transferable Radio Frequency Identification (RFID) assembly for attachment to an article comprises a RFID module; and a antenna module coupled with the RFID module, the antenna module comprising a conductive layer, a substrate, and an adhesive modification layer between the conductive layer and the substrate, the adhesive modification layer configured such that when the assembly is attached to the article and attempt to remove the assembly will cause the substrate to release and leave the conductive layer intact.

16 Claims, 5 Drawing Sheets

(56) References Cited

U.S. PATENT DOCUMENTS

| | | |
|---|---|---|
| 8,072,333 B2 | 12/2011 | Ferguson et al. |
| 9,552,541 B2 | 1/2017 | Mullis et al. |
| 9,978,012 B2 * | 5/2018 | Mullis .............. G06K 19/07783 |
| 10,373,044 B2 * | 8/2019 | Mullis ................ G08B 13/2437 |
| 2007/0029384 A1 | 2/2007 | Atherton |

* cited by examiner

NON-TRANSFERABLE RADIO FREQUENCY IDENTIFICATION LABEL OR TAG

RELATED APPLICATIONS INFORMATION

This Application is a continuation of U.S. patent application Ser. No. 15/957,633 filed on Apr. 19, 2018, now U.S. Pat. No. 10,373,044 issued on Aug. 6, 2019, which in turn is a continuation of U.S. patent application Ser. No. 15/413,147 filed on Jan. 23, 2017, now U.S. Pat. No. 9,978,012 issued May 22, 2018, which in turn is a continuation of U.S. patent application Ser. No. 14/581,576, filed on Dec. 23, 2014, now U.S. Pat. No. 9,552,541, issued Jan. 24, 2017, which is a continuation of U.S. patent application Ser. No. 13/736,806, filed on Jan. 8, 2013, now U.S. Pat. No. 8,915,449, Issued on Dec. 23, 2014, which is a continuation of U.S. patent application Ser. No. 12/573,825, filed Oct. 5, 2009, now U.S. Pat. No. 8,350,704, Issued on Jan. 8, 2013, which in turn claims priority under 35 U.S.C. 119(e) to U.S. Provisional Patent Application Ser. No. 61/102,645, filed Oct. 3, 2008, all of which are incorporated herein by reference in their entirety as if set forth in full.

BACKGROUND

1. Technical Field

The embodiments described herein are related to preventing the removal of a Radio Frequency Identification (RFID) label or tag once it has been affixed to an appropriate item in order to associate the label or tag with another item.

2. Related Art

The embodiments described herein are related to Radio Frequency Identification (RFID) systems and more particularly to methods and apparatus to prevent unwanted and/or unwarranted access to information stored on an RFID chip.

RFID is an automatic identification method, relying on storing and remotely retrieving data using devices called RFID tags or transponders. The technology requires some extent of cooperation of an RFID reader and an RFID tag. An RFID tag is an object that can be applied to or incorporated into a variety of products, packaging, identification mechanisms, etc., for the purpose of identification and tracking using radio waves. For example, RFID is used in enterprise supply chain management to improve the efficiency of inventory tracking and management. Some tags can be read from several meters away and beyond the line of sight of the reader.

Most RFID tags contain at least two parts: One is an integrated circuit for storing and processing information, modulating and demodulating a radio-frequency (RF) signal, and other specialized functions. The second is an antenna for receiving and transmitting the signal. As the name implies, RFID tags are often used to store an identifier that can be used to identify the item to which the tag is attached or incorporated. But in today's systems, a RFID tag can contain non-volatile, possibly writable EEPROM for storing additional data as well.

Most RFID systems use a modulation technique known as backscatter to enable the tags to communicate with the reader or interrogator. In a backscatter system, the interrogator transmits a Radio Frequency (RF) carrier signal that is reflected by the RFID tag. In order to communicate data back to the interrogator, the tag alternately reflects the RF carrier signal in a pattern understood by the interrogator. In certain systems, the interrogator can include its own carrier generation circuitry to generate a signal that can be modulated with data to be transmitted to the interrogator.

RFID tags come in one of three types: passive, active, and semi passive. Passive RFID tags have no internal power supply. The minute electrical current induced in the antenna by the incoming RF signal from the interrogator provides just enough power for the, e.g., CMOS integrated circuit in the tag to power up and transmit a response. Most passive tags signal by backscattering the carrier wave from the reader. This means that the antenna has to be designed both to collect power from the incoming signal and also to transmit the outbound backscatter signal.

Passive tags have practical read distances ranging from about 10 cm (4 in.) (ISO 14443) up to a few meters (Electronic Product Code (EPC) and ISO 18000-6), depending on the chosen radio frequency and antenna design/size. The lack of an onboard power supply means that the device can be quite small. For example, commercially available products exist that can be embedded in a sticker, or under the skin in the case of low frequency RFID tags.

Unlike passive RFID tags, active RFID tags have their own internal power source, which is used to power the integrated circuits and to broadcast the response signal to the reader. Communications from active tags to readers is typically much more reliable, i.e., fewer errors, than from passive tags.

Active tags, due to their on board power supply, also may transmit at higher power levels than passive tags, allowing them to be more robust in "RF challenged" environments, such as high environments, humidity or with dampening targets (including humans/cattle, which contain mostly water), reflective targets from metal (shipping containers, vehicles), or at longer distances. In turn, active tags are generally bigger, caused by battery volume, and more expensive to manufacture, caused by battery price.

Many active tags today have operational ranges of hundreds of meters, and a battery life of up to 10 years. Active tags can include larger memories than passive tags, and may include the ability to store additional information received from the reader, although this is also possible with passive tags.

Semi-passive tags are similar to active tags in that they have their own power source, but the battery only powers the microchip and does not power the broadcasting of a signal. The response is usually powered by means of backscattering the RF energy from the reader, where energy is reflected back to the reader as with passive tags. An additional application for the battery is to power data storage.

The battery-assisted reception circuitry of semi-passive tags leads to greater sensitivity than passive tags, typically 100 times more. The enhanced sensitivity can be leveraged as increased range (by one magnitude) and/or as enhanced read reliability (by reducing bit error rate at least one magnitude).

The enhanced sensitivity of semi-passive tags place higher demands on the interrogator concerning separation in more dense population of tags. Because an already weak signal is backscattered to the reader from a larger number of tags and from longer distances, the separation requires more sophisticated anti-collision concepts, better signal processing and some more intelligent assessment of which tag might be where.

FIG. 1 is a diagram illustrating an exemplary RFID system 100. In system 100, RFID interrogator 102 communicates with one or more RFID tags 110. Data can be exchanged between interrogator 102 and RFID tag 110 via radio transmit signal 108 and radio receive signal 112. RFID interrogator 102 comprises RF transceiver 104, which contains transmitter and receiver electronics, and antenna 106, which are configured to generate and receive radio transit signal 108 and radio receive signal 112, respectively. Exchange of data can be accomplished via electromagnetic or electrostatic coupling in the RF spectrum in combination with various modulation and encoding schemes.

RFID tag 110 is a transponder that can be attached to an object of interest and act as an information storage mechanism. In many applications, the use of passive RFID tags is desirable, because they have a virtually unlimited operational lifetime and can be smaller, lighter, and cheaper than active RFID tags that contain an internal power source, e.g. battery. Passive RFID tags power themselves by rectifying the RF signal emitted by the RF scanner. Consequently, the range of transmit signal 108 determines the operational range of RFID tag 110.

RF transceiver 104 transmits RF signals to RFID tag 110, and receives RF signals from RFID tag 110, via antenna 106. The data in transmit signal 108 and receive signal 112 can be contained in one or more bits for the purpose of providing identification and other information relevant to the particular RFID tag application. When RFID tag 110 passes within the range of the radio frequency magnetic field emitted by antenna 106, RFID tag 110 is excited and transmits data back to RF interrogator 102. A change in the impedance of RFID tag 110 can be used to signal the data to RF interrogator 102 via receive signal 112. The impedance change in RFID tag 110 can be caused by producing a short circuit across the tag's antenna connections (not shown) in bursts of very short duration. RF transceiver 104 senses the impedance change as a change in the level of reflected or backscattered energy arriving at antenna 106.

Digital electronics 114, which can comprise a microprocessor with RAM, performs decoding and reading of receive signal 112. Similarly, digital electronics 114 performs the coding of transmit signal 108. Thus, RF interrogator 102 facilitates the reading or writing of data to RFID tags, e.g. RFID tag 110 that are within range of the RF field emitted by antenna 104. Together, RF transceiver 104 and digital electronics 114 comprise reader 118. Finally, digital electronics 114 and can be interfaced with an integral display and/or provide a parallel or serial communications interface to a host computer or industrial controller, e.g. host computer 116.

With today's processing technology, and because they do not need a battery, conventional passive tags can be made very thin and very small. Consequently, they are finding more and more application in various industries for tracking and identification. For example, today's passive tags can be incorporated into a label that can be affixed to merchandise, books, documents, passports or visas, car license plates or windshields, etc. A problem that arises, however, is how to prevent someone from removing such a label from the appropriate item and re-attaching or affixing it to another, e.g., counterfeit item?

Most conventional solutions to this problem involve designing the tag or label so that the tag is altered and will no longer function, or will not be able to function optimally, if the tag or label is removed from the item to which it was originally affixed. One problem with this solution is that the tag typically cannot be used to identify the original item either.

SUMMARY

A non-transferable RFID tag or label that maintains its functionality when someone attempts to remove the tag or label from the item to which it is attached and that can indicate an attempt to tamper with the tag or label is disclosed herein A Non-transferable Radio Frequency Identification (RFID) assembly for attachment to an article comprises a RFID module; and a antenna module coupled with the RFID module, the antenna module comprising a conductive layer, a substrate, and an adhesive modification layer between the conductive layer and the substrate, the adhesive modification layer configured such that when the assembly is attached to the article and attempt to remove the assembly will cause the substrate to release and leave the conductive layer intact.

A Non-transferable Radio Frequency Identification (RFID) assembly for attachment to an article, comprises a RFID module; and a antenna module coupled with the RFID module, the antenna module comprising a conductive layer, a substrate, and an adhesive modification layer between the conductive layer and the substrate, the adhesive modification layer configured such that when the assembly is attached to the article and attempt to remove the assembly will cause the substrate and the conductive layer to completely release from the assembly leaving the RFID module intact.

A Non-transferable Radio Frequency Identification (RFID) assembly for attachment to an article, comprises a antenna module; and a RFID module coupled with the antenna module, the RFID module comprising a substrate, a conductive layer on the substrate, a chip attached to the conductive layer, and an adhesive modification layer between the conductive layer and the substrate, the adhesive modification layer configured such that when the assembly is attached to the article and attempt to remove the assembly will cause the antenna module, the substrate, and the conductive layer to completely release from the assembly.

These and other features, aspects, and embodiments are described below in the section entitled "Detailed Description."

BRIEF DESCRIPTION OF THE DRAWINGS

Features, aspects, and embodiments are described in conjunction with the attached drawings, in which.

DETAILED DESCRIPTION

Figure 1:
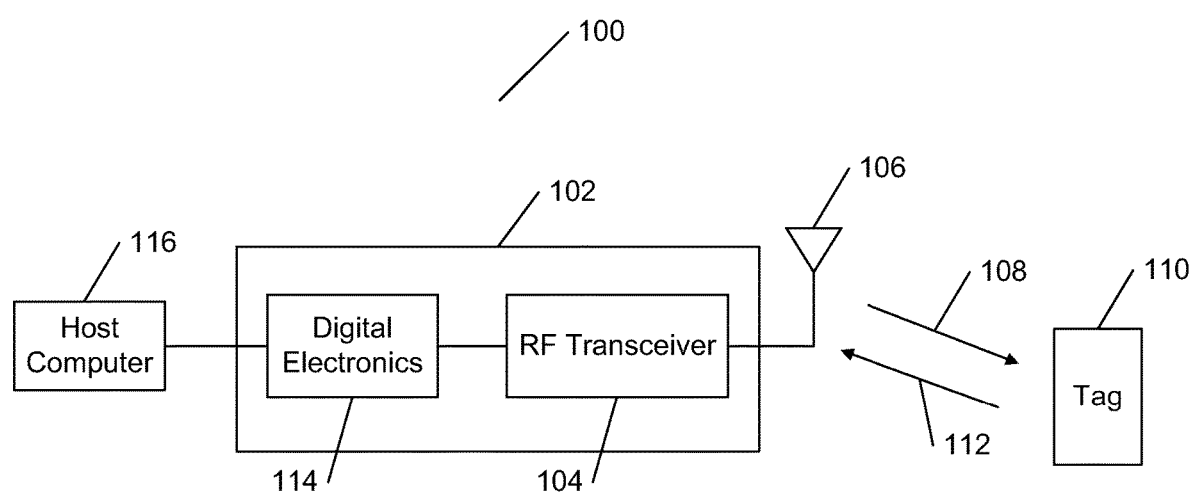
FIG. 1 is a diagram illustrating an exemplary RFID system.
Figure 2:
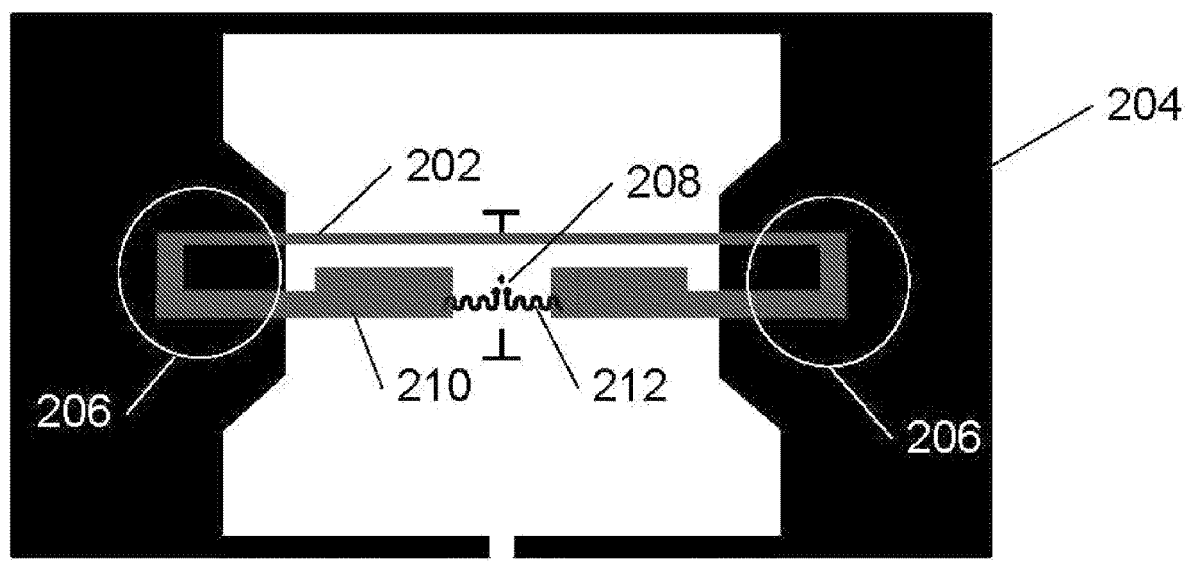
FIG. 2 is a diagram illustrating a two part RFID tag construction that includes an RFID module in accordance with one embodiment.

FIG. 2 is a diagram illustrating an example RFID tag 200 that uses a capacitively coupled module construction. As can be seen, tag 200 comprises a module 202 and a tag antenna 204. Module 202 comprises a loop 210 coupled with a chip 208 via conductive traces 212. In certain respects, module 202 is itself a mini-tag that can transmit and receive signals, typically in the Intermediate Frequency (IF) range; however, module 202 is designed to be couple with a plurality of boost antennas, such as antenna 204 illustrated in the example of FIG. 1.

Thus, antenna 204 and module 202 are configured such that they will, when combined, provide the appropriate operational characteristics, such as frequency and range for a given application. It will be understood, therefore, that module 202 will include a matching circuit configured to match the combined impedance of antenna 204 and loop 210 with the inputs to chip 208. By using such a two part construction, cost reduction can be achieved when producing multiple tag types, e.g., low, medium, and high dielectric tags, in even moderate quantities. This is because chip 208 can be attached to module 202 and tested, either through direct contact or through loop 210 without the need to test the entire tag 200, which can be more cumbersome and costly.

Module 202 can be constructed on a substrate (not shown), such as a flexible plastic substrate, by, e.g., printing, screening, etc., loop 210 and traces 212 on the substrate. For example, the substrate can be a thin mylar film, e.g., nominally 0.003" thick. Chip 210 can then be attached, e.g., via soldering, conductive adhesive, etc., to traces 212. Similarly, antenna 204 can be constructed on a substrate (not shown), e.g., via printing, screening, etc. Capacitive coupling can then be used to couple loop 212 with antenna 204.

In capacitive coupling, module 202 is adhered with the, e.g., mylar substrate (not shown) of module 202 isolating the, e.g., conductive ink used to form loop 212 from the, e.g., conductive ink used to form antenna 204. This forms a capacitive region 206 where loop 212 overlaps antenna 204. The two pieces, i.e., module 202 and antenna 204 can be pressed and held together by an adhesive not shown. The RF energy gathered from booster antenna 204 will transfer through the adhesive, through the RFID module 202 substrate (not shown) and conduct the RF energy into RFID module 202. There is no need for any type of ohmic via between layers with this structure as in conventional devices.

By using this capacitive coupling technique, RFID modules can be manufacturing in an efficient and cost-saving layout with high density. The same RFID module design could be used with many booster antenna designs and styles. As long as the module can be mated with the booster antenna and the capacitive coupling overlap area is present, booster antennas of many types or sizes can be modified at will to fit the customer's application.

Figure 3A:
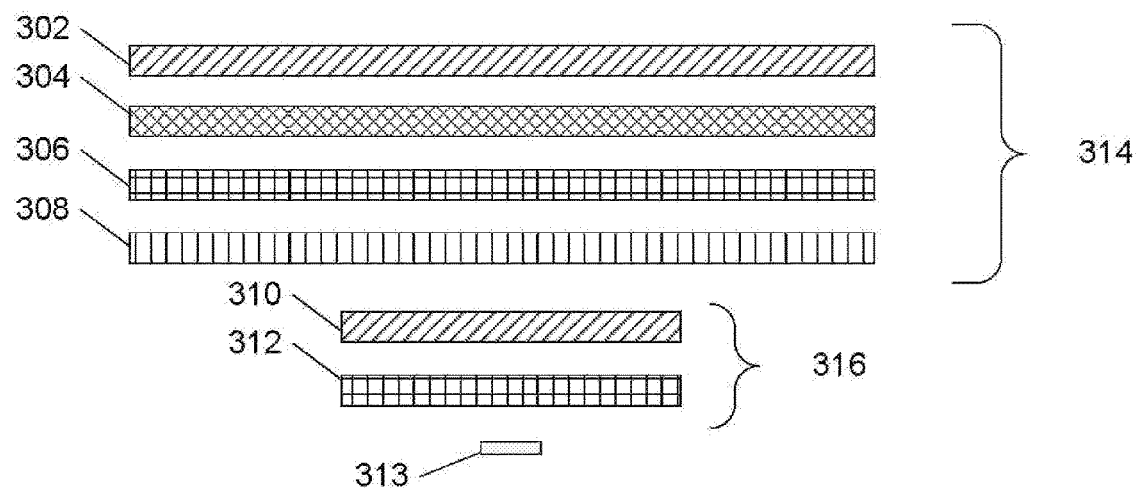
FIGS. 3A and 3B are diagrams illustrating the construction of a non-transferable RFID tag in accordance with various embodiments.

The capacitive coupling can prevent transfer of tag 200 from one device to another. FIG. 3A is a diagram illustrating one approach to preventing transfer of such a tag. As can be seen, the tag or label illustrated in FIG. 3A consists of an antenna substrate 302 and a conductive layer 306. Conductive layer 306 can comprise the conductive pattern that forms antenna 204. An adhesive modification layer can be interposed between substrate 302 and conductive layer 306.

Tag 300 can further comprise a module 316 comprising a substrate 310; a conductive layer 312, comprising the conductive pattern that forms loop 210 and traces 212; and a chip 313. Module 316 can be attached to the rest of the assembly via an adhesive layer 308. When module 316 is applied over adhesive 308 to enable the performance gain offered by the capacitive coupling of booster antenna 314, much of the surface area of booster antenna 314 will remain uncovered by module 316 and provide the surface area for attachment to the customer's item.

Once this assembly 300 is applied to an item and held to that surface by adhesive 308, booster antenna 314 will provide all the adhesion surface area. If assembly 300 is removed from the original surface, the booster antenna pattern 306 will be disturbed in the areas where adhesion modification layer 304 was deposited, and the range performance gain offered by the booster antenna will be altered.

However, module 316 does not have any adhesion modification or adhesive applied to it. When antenna 314 is disabled, or module 316 is removed from antenna 314, module 316 will return to its native performance characteristic, being functional for only a very short distance. This can allow verification of the memory contents of chip 313. Further, module 316 can be used again. It should be noted, however, while module 316 can be reused, tag or label 300 cannot simply be removed from the appropriate item and placed on another item.

Figure 3B:
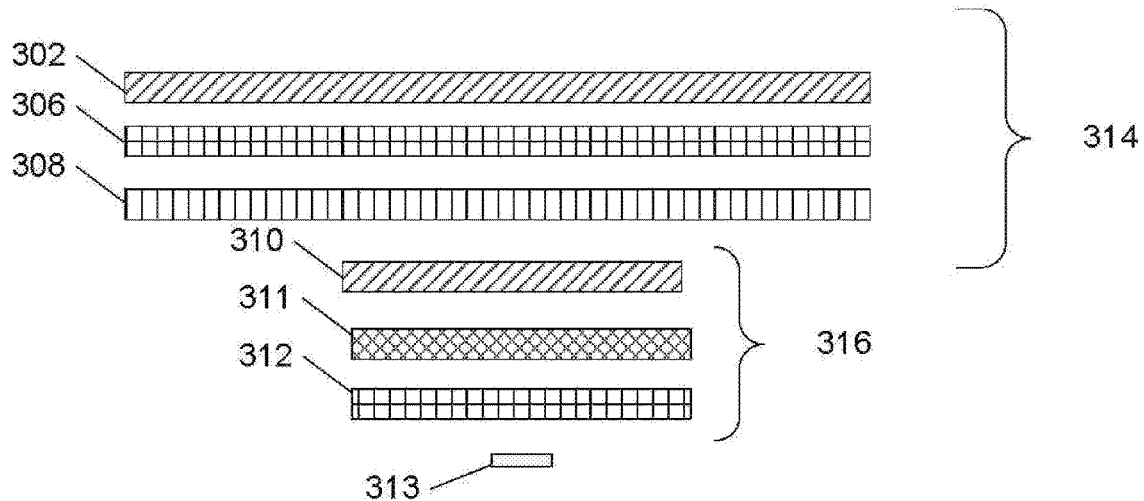

FIG. 3B is a diagram illustrating another example non-transferable assembly 301 in accordance with another embodiment. In this example, an adhesive modification layer 311 is included between conductive layer 312 and substrate 310, such that if someone attempt to remove assembly 301, loop 210, traces 212, or both will be disturbed so that RF energy cannot activate chip 313 on module 316. With this construction, assembly 301 can be rendered nonfunctional at any power level.

Figure 4A:
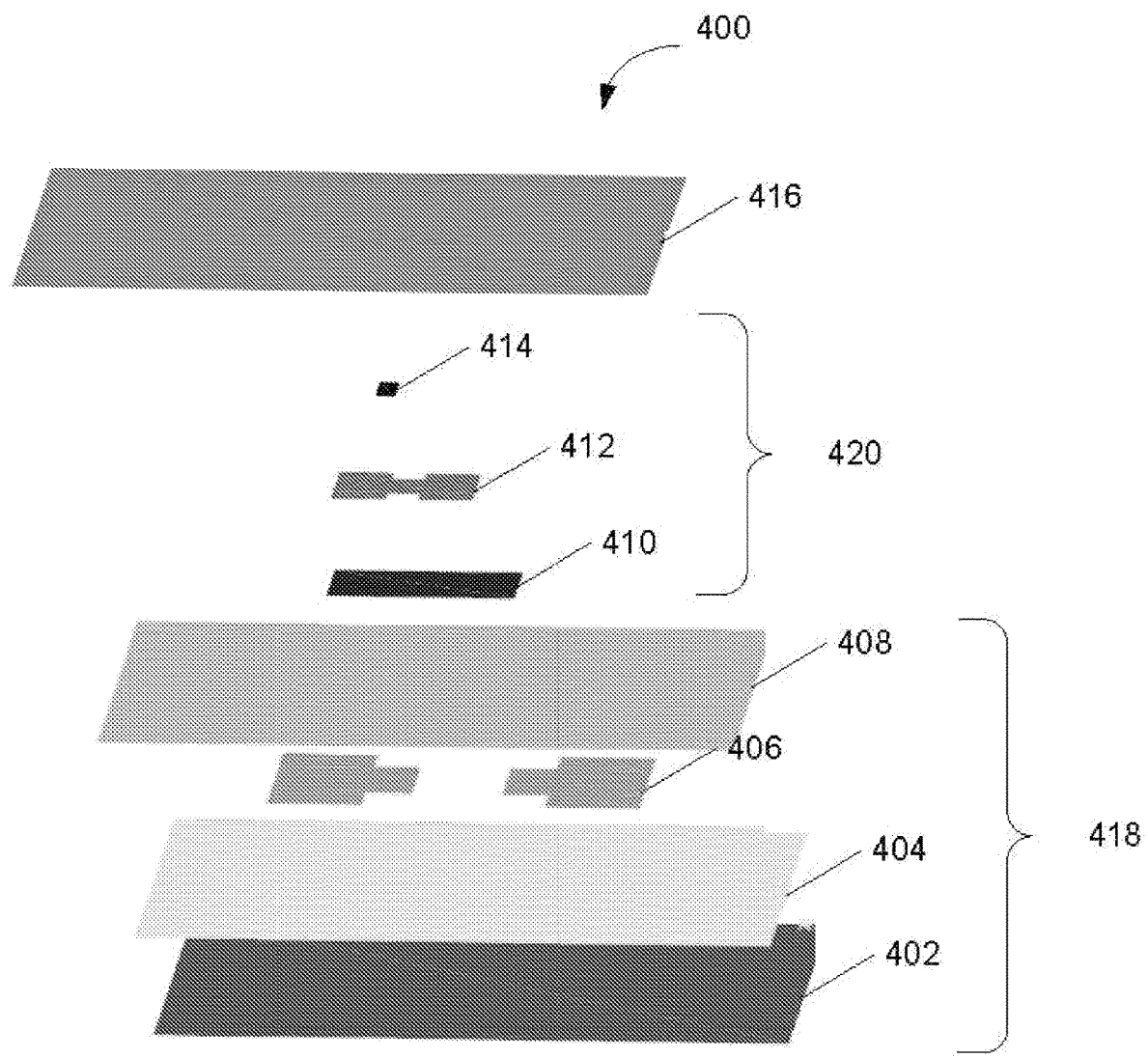
FIGS. 4A and 4B are diagrams illustrating the construction of a non-transferable RFID tag in accordance with various other embodiments.
Figure 4B:
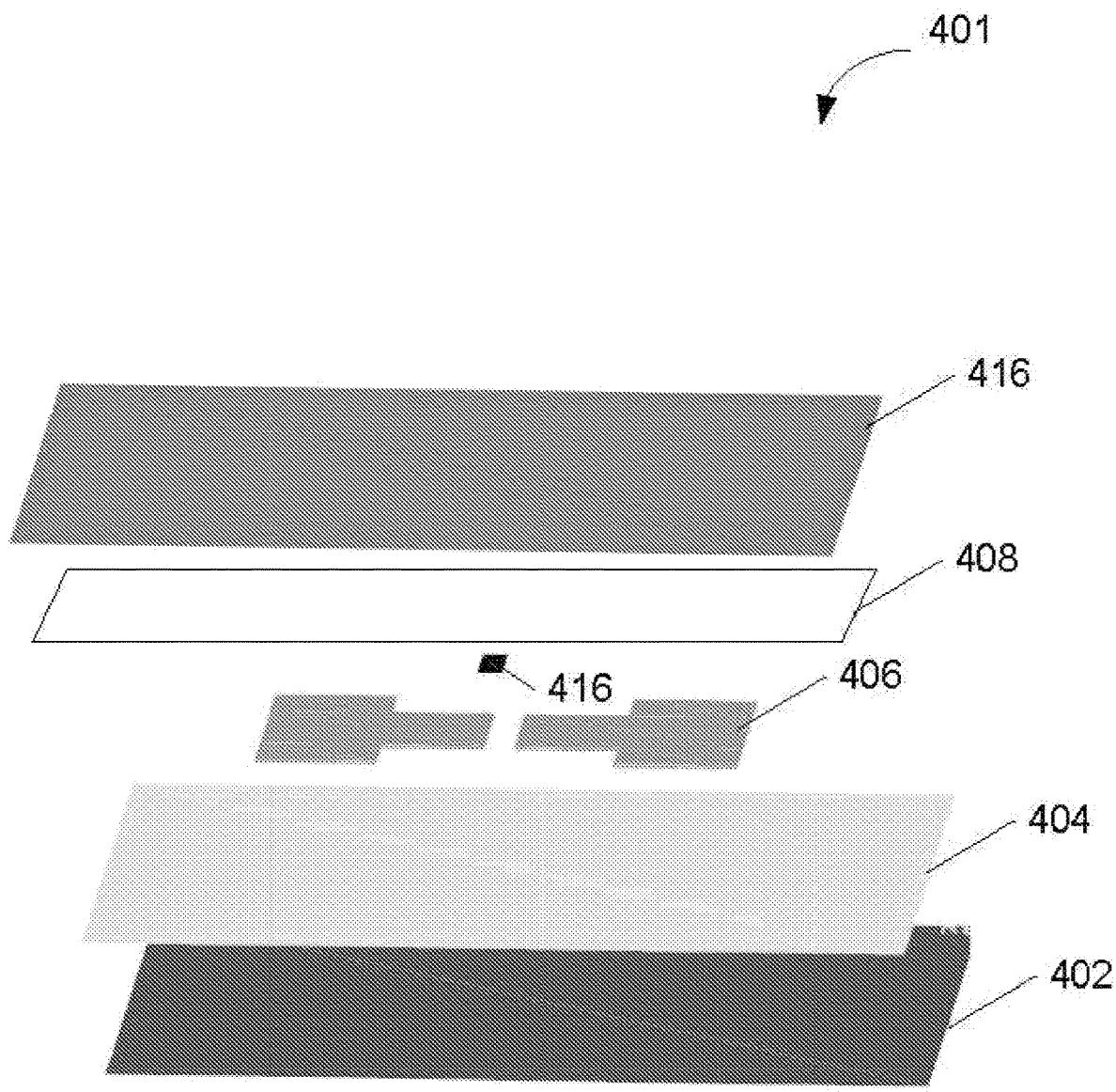

It can be desirable for the assembly to remain intact and operational should someone attempt to remove the assembly from the item to which it is attached. FIGS. 4A and 4B are diagrams illustrating further example embodiments of non-transferable tags or labels that remain operational when someone attempts to remove them. In these embodiments, when the RFID tag liner or carrier is peeled away or removed from the authentic item the transponder including antenna ink will remain intact on the authentic item such that the performance is not adversely affected. The RFID tag is therefore nontransferable and cannot be transferred to an unauthorized or counterfeit item because the carrier media that originally supported the tag has been removed. The removal of the carrier also serves to identify a physical tampering of the RFID tag. The carrier itself can also incorporate other security printing inks, fibers, and tamper evident features, such as holograms. The carrier can be constructed from plastic, PVC, mylar, polycarbonate, teslin, demetalized foils, or other flexible substrates.

FIG. 4A is a diagram illustrating a multi-layer assembly 400 similar to that illustrated in FIGS. 3A and 3B. The first layer 418 is the Booster layer. It begins with a blank substrate 402, which can be completely coated with a release agent 404. Antenna 406 composes the next layer. Antenna 404 can be silver ink, copper, aluminum, etc. An adhesive 408 coating then completes the first layer 418.

The second layer is the module layer 420. It also begins with a blank substrate 410. A module antenna 412 can then be attached to blank substrate 410. Antenna 412 can be formed by silver ink, copper, aluminum, etc. An IC chip 414 can then be attached to module antenna 412.

The two layers 418 and 420 can be assembled by attaching the module substrate 410 to booster layer 418 via adhesive 408. A protective liner 416 can be placed atop the assembly in order to protect the exposed adhesive 408 that is not already covered by module substrate 410. This will protect booster antenna 406 until it is placed on the original/authentic item. Protective liner 416, if present, will be removed to expose adhesive 408 before assembly 400 is placed on the original or authentic item.

Module 420 can be coupled with antenna 418 via a conductive, inductive, or capacitive coupling technique. Module 410 and booster antenna 418 must have some area where they overlap so that the capacitive or direct coupling of energy can occur. The RF energy gathered from booster antenna 418 will transfer, e.g., through adhesive 408, through substrate 410 and conduct the RF energy into RFID module 420.

In this embodiment, when someone attempts to remove assembly 400, the entire assembly 400 will release from substrate 404 and will remain affixed to the item such that the performance is not adversely affected. The removal of substrate 402 from assembly 400 can be used as an indicator of a physical tampering with assembly 400. Thus, the booster antenna adhesive 408 remains attached to the original or authentic item, along with the conductive trace pattern that forms antenna 406. Release agent 404 under the conductive trace pattern allows substrate 402 to be removed without altering booster antenna 418 or module 420. However, since substrate 402, which acts as a carrier for assembly 400 is removed, there is virtually no method to transfer assembly 400 to, e.g., a counterfeit item.

FIG. 4B is a diagram illustrating a single layer assembly 401. Assembly 401 comprises a release layer 404 applied to a substrate 402. An antenna 406 can then be applied on top of release layer 404. Antenna 406 can be formed with silver ink, copper, aluminum, etc. An IC chip 414 can then be attached to antenna 406. A protective liner 416 can be placed atop the assembly in order to protect the exposed adhesive 408. This will protect the antenna 406 until it is placed on the original/authentic item.

The operation of assembly 401 will then be similar to that described with respect to assembly 400. In other words, if someone attempts to remove assembly 401, substrate 402 will release leaving the remaining layers intact, operational, and attached to the authentic item. Removal of substrate 402 will also indicate tampering with assembly 401.

While certain embodiments have been described above, it will be understood that the embodiments described are by way of example only. Accordingly, the systems and methods described herein should not be limited based on the described embodiments. Rather, the systems and methods described herein should only be limited in light of the claims that follow when taken in conjunction with the above description and accompanying drawings.

What is claimed is:

1. A radio frequency identification (RFID) tag, comprising:
   a first end that is attachable to an item;
   a substrate at a second end of the RFID tag, the substrate coated with a release agent;
   an antenna positioned on the release agent between the substrate and the first end;
   a layer of adhesive between the antenna and the first end; and
   a chip coupled to the substrate via the adhesive, positioned between the antenna and first end,
   wherein the RFID tag is configured to be attached to an item at the first end via the adhesive, and wherein the release agent releases the substrate and leaves the remainder of the RFID tag attached to the item in response to an attempt to remove the non-transferable RFID tag from the item.

2. The RFID tag of claim 1, wherein the attempt to remove the RFID tag does not adversely affect the performance of the RFID tag.

3. The RFID tag of claim 1, wherein release of the substrate is an indicator of tampering with the RFID tag.

4. The RFID tag of claim 1, wherein the substrate is completely coated with the release agent.

5. The RFID tag of claim 1, wherein the adhesive is between the antenna and the chip.

6. The RFID tag of claim 1, wherein the adhesive is between the chip and the first end.

7. The RFID tag of claim 1, wherein the chip is coupled with the antenna via one of conductive coupling, inductive coupling, and capacitive coupling.

8. A radio frequency identification (RFID) tag, comprising:
   a first module comprising a first substrate and a first antenna;
   a second module comprising a chip; and
   a layer of adhesive between the first module and the second module,
   wherein the RFID tag is configured to be affixed to an article via the adhesive, and wherein the first substrate is releaseable in response to an attempt to remove the RFID tag from the item leaving the remainder of the RFID tag affixed to the item.

9. The RFID tag of claim 8, wherein the first module further comprises:
   the first antenna between the first substrate and the adhesive; and
   a release agent between the first antenna and the first substrate, wherein the release agent is configured to release the first substrate in response to the attempt to remove the RFID tag.

10. The RFID tag of claim 9, wherein the release agent completely coats the first substrate.

11. The RFID tag of claim 10, wherein the adhesive layer at least completely coincides with the release agent.

12. The RFID tag of claim 9, wherein the second module further comprises:
   a second substrate affixed to the adhesive; and
   a second antenna between the second substrate and the chip.

13. The RFID tag of claim 12, wherein the second module is coupled to the first module via one of conductive coupling, inductive coupling, and capacitive coupling.

14. The RFID tag of claim 8, wherein the first module is configured to transfer radio frequency energy through the adhesive into the second module.

15. The RFID tag of claim 8, wherein the attempt to remove the RFID tag does not adversely affect the performance of the RFID tag.

16. The RFID tag of claim 8, wherein release of the substrate is an indicator of tampering with the RFID tag.

* * * * *